United States Patent [19]
Garner

[11] 3,809,519
[45] May 7, 1974

[54] INJECTION MOULDING MACHINES
[75] Inventor: Paul Johnson Garner, Thorpe Bay, England
[73] Assignee: Imperial Chemical Industries, Limited, London, England
[22] Filed: Oct. 19, 1972
[21] Appl. No.: 299,123

Related U.S. Application Data
[60] Continuation-in-part of Ser. No. 132,971, April 12, 1971, which is a division of Ser. No. 781,763, Oct. 6, 1968, Pat. No. 3,599,290.

[30] Foreign Application Priority Data
Dec. 15, 1967 Great Britain ................. 57081/67

[52] U.S. Cl.............. 425/245, 425/132, 137/625.41
[51] Int. Cl.............................................. B29f 1/03
[58] Field of Search .......... 425/129, 130, 245, 247, 425/DIG. 229, 132; 137/625.41; 254/328

[56] References Cited
UNITED STATES PATENTS
| | | | |
|---|---|---|---|
| 2,367,204 | 1/1945 | Cousino | 425/245 X |
| 3,191,233 | 6/1965 | Linderoth, Jr. | 425/247 X |
| 3,431,600 | 3/1969 | Bullard et al. | 425/245 |

Primary Examiner—Robert L. Spicer, Jr.
Attorney, Agent, or Firm—Cushman, Darby & Cushman

[57] ABSTRACT
A multiway valve in a "two-shot" injection moulding machine having separate tapered passageways for alternately connecting the sources of material with a single outlet. The valve also has a shut-off position wherein neither source is connected to the outlet.

6 Claims, 11 Drawing Figures

INJECTION MOULDING MACHINES

RELATED U.S. APPLICATIONS

This application is a continuation-in-part of pending Application Ser. No 132 971 filed Apr. 12, 1971, now U.S. Pat. No. 3,733,156, which in turn is a divisional of Application Ser. No. 781 763 filed Dec. 6, 1968 now issued as U.S. Pat. No. 3 599 290.

The present invention relates to improvements in or relating to injection moulding machines suitable for the production of laminar articles having a core of an injection mouldable synthetic resin material enclosed in a skin of a different injection mouldable synthetic resin material.

Such articles may be produced by sequential injection of the materials into the mould through a common sprue channel. In this way the material forming the skin of the article is the first to be injected in to the mould and is then forced to the extremities of the mould by the pressure due to the injection of the core material thus ensuring that the skin material does in fact provide the whole of the skin.

Throughout the present specification and claims the term "sprue" is used to describe the channel connecting the valve to the mould cavity.

One method of achieving such sequential injection is to provide an injection barrel connected to the sprue channel, in which barrel alternate plugs of skin and core material are introduced, with a plug of the skin material nearest the sprue channel. In this way, as the contents of the injection barrel are discharged into the mould, the skin material is first injected followed by the core material. However in such an arrangement mixing of the skin and core materials is liable to occur with consequent risk of contamination of the skin of the article with core material hence giving rise to the possibility of a poor surface appearance to the article. Furthermore such an arrangement lacks versatility in that the skin and core materials have to be injected under the same process conditions e.g. temperatures and hence this imposes restraints on the combinations of skin and core materials that may be used.

It is therefore an object of the present invention to provide apparatus wherein material from separate sources can be sequentially injected into the mould cavity via a common sprue channel.

Accordingly we provide an injection moulding machine having i) two separate injection barrels, ii) a multiway valve comprising a housing and a tap body slidably movable therein, said housing having two inlet ports, each connected to one of said injection barrels, and a single outlet port through which material can be supplied to a sprue channel of a mould, said outlet port being of smaller cross section than said inlet ports, and said tap body having two separate passageways therein, arranged such that in one position of the tap body one passageway is connected to one inlet port and to the outlet port with the other passageway disconnected from the outlet port and in another position the other passageway is connected to the other inlet port and said outlet port with said one passageway disconnected from said outlet port and in a third position neither passageway is connected to the outlet port, the inlet of each passageway being the same cross section as the inlet port connectable with that passageway and the outlets of said passageways being of smaller cross section than the inlets of said passageways, and said passageways being disposed such that as the body is moved from the first position to the second, and vice versa, one passageway communicates with its inlet port before its outlet communicates with the outlet port, and iii) means for moving said tap body relative to said housing from one of said positions to another.

In operation the valve is initially in the position, referred to hereinafter as the shut-off position, wherein neither passageway is connected to the outlet. In this position the injection barrels are isolated from each other and from the sprue channel and hence the mould. Consequently while in this state the mould cavity can be opened and the moulding formed in the previous moulding cycle can be removed and the mould reclosed and the injection barrels recharged with the moulding materials in conventional manner.

The pressure on the skin moulding material situated in the first injection barrel is then built up to the desired injection pressure and the tap body moved towards the position wherein the first passageway is connected to the inlet port associated with the first injection barrel and with the outlet port. Because the inlet of the passageway of the tap is larger than the outlet thereof, the inlet of the passageway communicates with its associated inlet port before its outlet communicates with the outlet port. Thus the moulding material remaining in the passageway from the previous moulding cycle is subjected to the injection pressure built up in the first injection barrel before that passageway connects with the outlet port and so before injection commences. When that passageway connects to the outlet port, injection occurs.

When the desired amount of skin material has been injected from the first injection barrel the tap body is moved to the position wherein the other inlet port, and hence the second injection barrel which contains the core material, is connected to the outlet port by the other passageway. As before, the pressure in the second injection barrel is raised to the desired injection pressure in readiness for injection and the material in the second passageway is raised to this pressure before this passageway connects with the outlet port. At least when the second passageway is fully connected to the outlet port the first passageway is disconnected therefrom. Although it will be appreciated that, if desired, and, as will be described hereinafter, is in some cases preferable, the disposition of the passageways may be such that one passageway is not completely disconnected from the outlet port until after the other passageway has started communicating with the outlet port.

When the desired amount of core material has been injected from the second injection barrel, the tap body is moved to the shut-off position, if desired and as described hereinafter, via the position wherein a further amount of skin material is injected. The material injected into the mould cavity is then allowed to solidify and the moulding removed. Preferably the material in the sprue channel, i.e. downstream of the tap body is also removed either attached to the moulding or as a separate sprue.

In order to achieve rapid moulding cycles it is desirable that the mould cavity walls are heated or cooled, as appropriate, to enhance solidification of the synthetic resin material. Thus where the synthetic resin materials are thermoplastics that are solidified by cooling, the mould walls are preferably cooled, e.g. by water circulating within the mould members defining the mould cavity, while, where the synthetic resin materials are thermosetting, i.e. materials that are converted to the solidified state by heating, the mould walls are preferably heated.

On injection of the synthetic resin materials into the mould cavity, the materials adjacent the walls solidify before that in the centre of the cavity. As the material is injected into the mould cavity, it contacts the mould wall and then spreads out from the injection orifice, herein termed sprue channel, towards the mould extremities. Thus while material is being injected, the melt front is continuously moving until it is halted by contact with the mould wall. We have noticed that if the melt front temporarily stops moving and is not in contact with the mould wall, a line may appear on the surface of the moulded article at a point corresponding to the position of the melt front where it was temporarily halted. This line is believed to be caused by preferential solidification of the melt at the point where the melt front is stationary. Some materials exhibit this line, herein termed a hesitation mark, to a greater extent than other materials.

As described above, during the injection cycle it is necessary to switch from injection of one material to the other. While it is possible to arrange that the switchover is very rapid nevertheless a hesitation mark is still liable to occur.

By arranging that, as mentioned above as a preferment, the second passageway connects to the outlet port before the first passageway is completely disconnected from the outlet port, a small period wherein injection of both skin and core materials may be permitted during switchover. The criterion for this is that the distance between the nearest points of the outlets of the passageways is less than the cross-sectional dimension, in that direction, of the outlet port. In this way such hesitation lines may be reduced or eliminated. Because the materials in the passageways are subjected to the injection pressure, by virtue of being connected to the inlet ports before being connected to the outlet ports, before the passageways are connected to the outlet, contamination of one material by the other is minimised. Furthermore if the valve is switched to the shut-off position via the position wherein a further amount of skin material is injected, then any core material that entered the skin material passageway during switch-over to core material injection is swept out of that passageway into the sprue channel by the injection of the further amount of skin material. While this may give rise to a small amount of skin material in the core material passageway if overlap occurs during switching from the core material injection to injection of the further quantity of skin material, this is of no consequence as the contaminated core material will be injected to within skin material in the next cycle and so not mar the surface of the moulding.

There is a further reason for injecting a further quantity of skin material, namely so that when the sprue is removed from the moulded article the central portion of the exposed sprue area is composed of skin material rather than core material. Only a narrow annulus of core material will be exposed and, indeed, under many processing conditions this annulus may be so narrow as to be virtually indiscernable.

It will be appreciated that it is not necessary, although it is preferred, that when the tap body is in a position wherein one passageway is fully connected to its associated inlet port and the outlet port, with the other passageway disconnected from the outlet port, the other passageway is also disconnected from its associated inlet port.

The passageways of the tap may move between its various positions by reciprocation or preferably by rotation.

The inlet and outlet ports are preferably in the same plane. In this case, where the tap body is rotary, the passageways are preferably bores passing through the axis of rotation of the tap body.

Although the outlet of each passageway must be smaller than the inlet of that passageway, the inlet ports of the two passageways need not be the same size as each other. Preferably each passageway is tapered to reduce the size of the passageway from that of its inlet to that of its outlet.

The outlet of each passageway are preferably the same size as the outlet port, although the outlet of either or both of the passageways may be enlarged in the direction of the outlet of the other passageway so that the distance between the nearest points of the outlets is reduced.

Such enlargement of the outlets of the passageways gives a greater degree of overlapping of the materials injected through the two passageways. The outlets of the passageways however must not be enlarged to such an extent that the outlet of a passageway communicates with the outlet port before its inlet communicates with the associated inlet port.

While, during injection of one material, that material is liable to build up in the dead space created by such an enlargement of the outlet of a passageway, during the period of overlapping injection, this material in the dead space will be swept out of the passageway into the mould cavity. However dead spaces in the passageways that are not so swept in each injection cycle should be avoided.

The valve may conveniently be formed in the barrel end cap of a moulding machine or may be formed in the fixed platen of the machine or in a block attached to the fixed platen or in the mould itself. In our preferred machine the valve is formed in the barrel end cap of a moulding machine consisting of two injection barrels which are preferably parallel to each other.

The injection barrels are preferably of the reciprocating screw type.

The present invention is particularly, but not exclusively, applicable to the production of articles having a foamed core and an unfoamed skin. These articles may be produced by first injecting an unfoamable synthetic resin material into the mould and subsequently injecting a foamable synthetic resin material, containing a blowing agent which is then allowed to foam in the mould. The foaming may be permitted by injecting only such an amount of material into the mould so that the mould will be filled when foaming has taken place. Alternatively the amount of material injected may be such that the mould cavity is filled without any foaming taking place and then enlarging the mould cavity subsequent to the injection to provide room for the foamable material to expand. The mould may be enlarged mechanically or by the pressure generated by the decomposition of the blowing agent as is convenient.

The present invention is applicable to the injection moulding of any plastics materials that can be injected into a mould cavity while in the state of a viscous liquid and which can thereafter be caused to solidify in the mould cavity. Thus thermoplastic resinous materials that solidify on cooling may be used which can be injected in the form of viscous melts and allowed to solidify in the mould cavity by cooling. Alternatively thermosetting resinous materials may be used which can be injected into the mould cavity in the state of a viscous liquid and then caused to solidify by effecting cross-linking while in the cavity. Generally the thermosetting resinous materials are cross-linked by heating.

Examples of suitable injection mouldable thermoplastic resins which may be used include polymers and copolymers of α-olefines, such as high and low density polyethylene, polypropylene, polybutene, poly–4–-methyl pentene–1, propylene/ethylene copolymers, copolymers of 4–methyl pentene–1 with linear α-olefines containing 4 to 18 carbon atoms, ethylene/vinyl acetate copolymers; polymers and copolymers of vinyl chloride, vinyl acetate, vinyl butyral, styrene, substituted styrenes such as α-methyl styrene, acrylonitrile, butadiene, methyl methacrylate, vinylidene chloride. Specific examples of such polymers include vinyl chloride homopolymers and copolymers of vinyl chloride with vinyl acetate, propylene, ethylene, vinylidene chloride, alkyl acrylates such as 2–ethyl hexyl acrylate, alkyl fumarates, alkyl vinyl ethers, such as cetyl vinyl ether, and N-aryl maleimides such as N-o-chlorophenyl maleimide; polyvinyl acetate, polyvinyl butyral; polystyrene, styrene/acrylonitrile copolymers; polyacrylonitrile; copolymers of butadiene with methyl methacrylate and/or styrene and optionally acrylonitrile; polymethyl methacrylate; copolymers of methyl methacrylate with minor amounts of alkyl acrylate such as methyl acrylate, ethyl acrylate and butyl acrylate; copolymers of methyl methacrylate, N-aryl maleimides and optionally styrene; and vinylidene chloride/acrylonitrile copolymers; melt processable copolymers of tetrafluoroethylene and hexafluoropropylene.

Halogenated polymers or copolymers may be used; for example halogenated α-olefine polymers, such as chlorinated polyethylene, or halogenated vinyl chloride polymers, such as chlorinated polyvinyl chloride.

Other injection mouldable thermoplastic polymers that may be used include condensation polymers such as the injection moulding grades of linear polyesters such as polyethylene terephthalate; polyamides such as polycaprolactam, polyhexamethylene adipamides and copolyamides such as copolymers of hexamethylene diamine adipate and hexamethylene diamine isophthalate, particularly those containing from 5 to 15 percent by weight of hexamethylene diamine isophthalate; polysulphones and copolysulphones; polyphenylene oxides; polycarbonates, thermoplastic oxymethylene polymers; thermoplastic linear polyurethanes; and the thermoplastic derivatives of cellulose such as cellulose acetate, cellulose butyrate and mixed cellulosic esters, for example cellulose acetate butyrate.

Where a copolymer is used, the amounts of the co-monomers that are used in the copolymer will depend, inter alia, on the properties required of the moulding.

Thermosetting resins include plastics materials that either undergo cross-linking of their own accord or in the presence of a hardener or catalyst when heated to a sufficiently high temperature. Thus the term includes a material falling within the commonly understood ambit of the term "thermosetting", and also a plastics material which is normally thermoplastic but contains a cross-linking agent such as a peroxide which causes cross-linking when the plastic is heated to a sufficiently high temperature.

Examples of suitable thermosetting resins that may be used include phenol-aldehyde resins, amineformaldehyde resins, epoxy resins, polyester resins, thermosetting polyurethanes, and vulcanisable rubbers.

The resins may contain a hardening agent or catalyst where this is necessary to enable the resin to set.

Injection mouldable cross-linkable thermoplastics include copolymers of methyl methacrylate and glycol dimethacrylate and ethylene/vinyl acetate copolymers containing a cross-linking agent.

Blends of plastics materials may be used.

The core forming material may be the same as the skin forming material with the exception of additives which are included in one or in the other of the materials or in both but in different proportions. Alternatively the plastics may be quite different and also may contain different additives.

As mentioned hereinbefore, preferably the core forming material is foamable. Preferably it comprises a polymeric material and a blowing agent that evolves a gas on heating above a certain temperature, herein termed the activation temperature, e.g. by volatilisation or by decomposition, and is injected at a temperature above the activation temperature of the blowing agent. It is preferred that the plastics material is heated to the foaming temperature, i.e. to above the activation temperature, as it is injected into the sprue channel, by relying on the dynamic heating occurring as the material passes through the injection nozzle of the injection moulding machine.

The moulding machines of the present invention may be of the type in which material is introduced to the mould through more than one sprue and in the operation of such machines the material from one or more of these sprues may be provided by the technique of the present invention. In this instance the total amount of material that is allowed to flow through the valve during one moulding cycle should be the amount that is required from that sprue in the final moulding and will not then be the quantity required to fill the mould. If, on the other hand, the only supply of material to the mould is along a sprue which is fed by more than one source of material according to the present invention, then the amount that is allowed to pass through the valve in one moulding cycle will be the amount required to produce the moulding.

The timing of the operation of the machine according to the present invention must be synchronised so that the various operations involved take place at the correct time. Thus, firstly the mould is closed ready for the introduction of the moulding material; the valve is then switched to inject the skin material and the required quantity injected through the valve into the sprue; the valve then switched to inject core material. The valve is then switched to the shut-off position, if desired via the position wherein a further amount of skin material is injected. The pressure on the material in the mould from one of the sources is maintained until the valve is closed. Finally, if necessary the mould is enlarged to allow any foaming to take place, the material in the mould is solidified and the mould then opened and the moulding removed. The cycle may then be repeated.

The present invention is illustrated but in no way limited by reference to the accompanying drawings in which.

Figure 1:
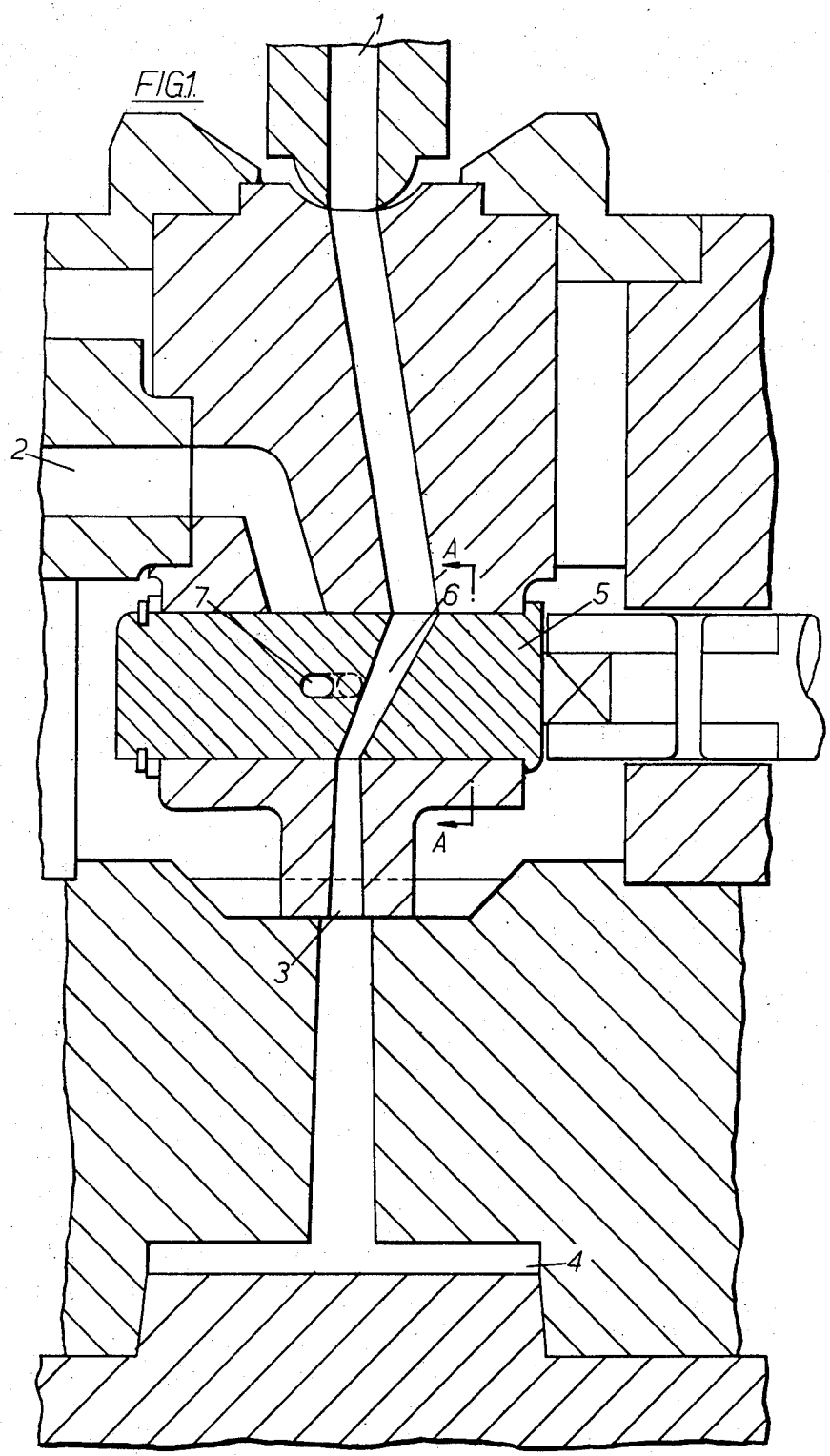
FIG. 1 is a section through the part of an injection moulding machine containing a valve according to the present invention and FIG. 2 is a section taken on AA' of FIG. 1, and FIGS. 3 to 7 are diagrammatic cross-sectional views through another form of tap showing the sequence of positions.

With reference to FIG. 1 the injection machine comprises two injection barrels 1 and 2 both of which deliver material into the sprue 3 and thence into the mould 4. The valve 5 is positioned in the paths of flow of the materials flowing from the two barrels; the valve is provided with two tapered bores 6 and 7, the bore 6 being adapted to allow material to flow from barrel 1 through the valve into the sprue and the bore 7 being adapted to allow material to flow from barrel 2 through the valve into the sprue. The inlets of the bores 6 and 7 are greater than the outlets thereof.

Figure 2:
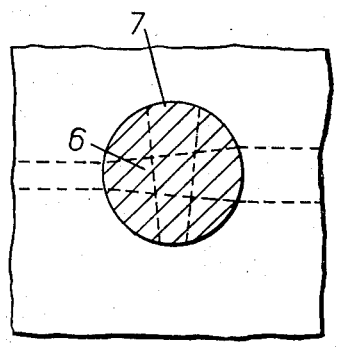

FIG. 2 is a cross-section along A'-A of FIG. 1 and illustrates how the bores 6 and 7 are formed in the tap.

In operation of the machine illustrated in FIG. 1 the valve is set to allow material to flow from one of the barrels, barrel 1 as shown in FIG. 1, into the sprue and when the desired amount of material has flowed from barrel 1 the valve is rotated as shown by the arrow so that bore 6 is taken out of register with barrel 1 and bore 7 is brought into register with barrel 2. Materials may then flow from barrel 2 into the sprue and the whole charge, including the original material from barrel 1, injected into the mould. It will be seen that, by virtue of the different sizes of the inlets and outlets of the bores, as the valve is rotated, the inlet of bore 7 communicates with barrel 2 before its outlet communicates with the sprue 3. The same applies for bore 6.

In the embodiment depicted in FIGS. 3 to 7, the valve consists of a housing 8 in which is rotatably mounted a cylindrical body 9. The housing is provided with two inlet ports 10, 11 and an outlet port 12. Inlet ports 10, 11 are each connected to injection barrels (not shown) of conventional nature. The outlet port 12 constitutes part of the sprue passage leading to the mould cavity (not shown). Means, not shown, are provided for rotating the body 9. These means may comprise a hydraulically or electrically-operated motor.

The inlet ports 10, 11 are of greater cross-section than the outlet port 12 so that the angle (AOB and COD) subtended by the inlet ports at the longitudinal axis (O) of the body 9 is greater than the angle (EOF) subtended by the outlet port 12 at the axis O of the body 9.

Figure 6:
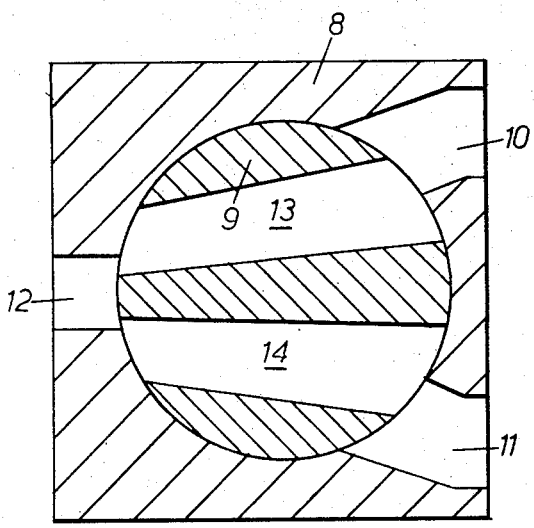

The body 9 has a pair of bores 13, 14 therethrough. Each bore is tapered so that its inlet is the same size as the inlet port 10 or 11 with which it is designed to communicate and its outlet is the same size as the outlet port 12. The distance between the outlets of the bores is less than the cross-sectional dimension EF of the outlet 12 so that at an intermediate position (as shown in FIG. 6) both bores may be in communication with the outlet 12. The condition for this is that the angle GOH subtended by the nearest points, G, H of the outlets of the bores at the axis O of the body 9 is less than the angle EOF subtended by the outlet port 12 at the axis O of the body 9.

Figure 3:
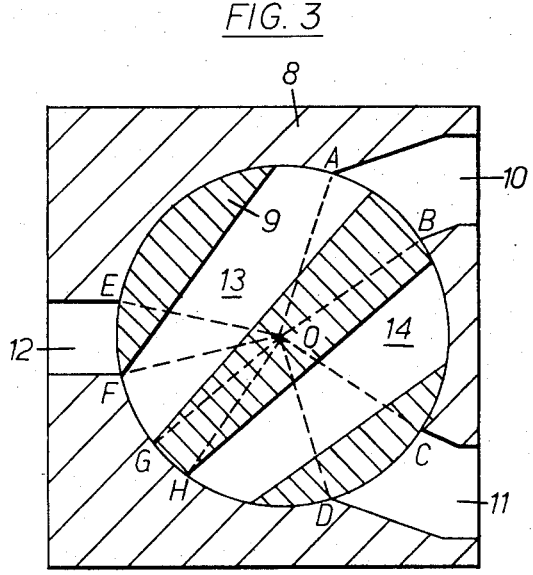

In the position depicted in FIG. 3, neither bore is in communication with the outlet 12 so that no material can be injected into the mould cavity. The cavity is thus isolated from the injection barrels, thereby enabling, inter alia, the moulding from the previous cycle to be removed from the cavity.

Figure 4:
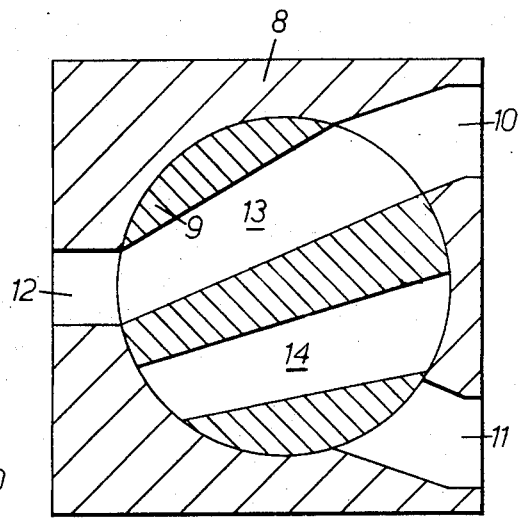

The body 9 is then rotated clockwise so that bore 13 is brought into communication with outlet 12 (see FIG. 4). This enables material to be injected from the inlet 10, through bore 13, into the outlet 12 and hence into the mould cavity. While material is being injected from inlet 10, the pressure is built up on the material in the injection barrel connected to inlet 11 so that when the inlet 11 is connected to outlet 12 there is minimum delay in injecting material from inlet 11.

Figure 5:
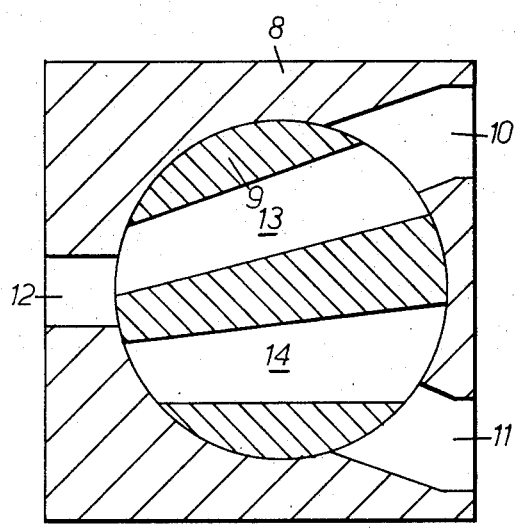
Figure 7:
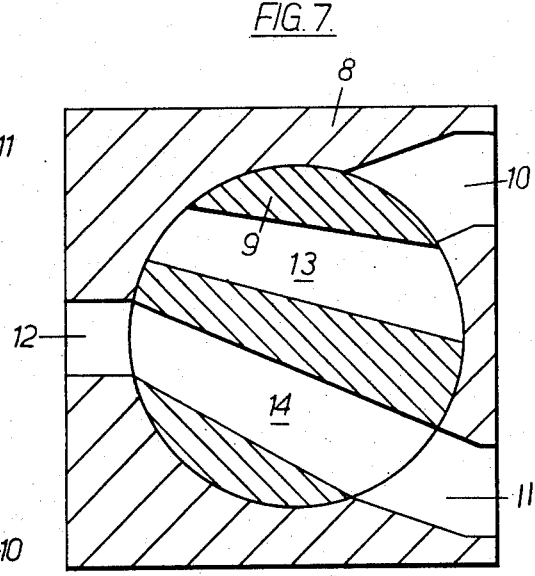

The body 9 is then rotated further clockwise, through the positions of FIGS. 5 and 6, to that of FIG. 7. It is seen in FIG. 5 that while inlet 10 is still connected to outlet 12 by bore 13, bore 14 has opened into communication with inlet 11. This means that if the material in the injection barrel connected to inlet 11 is pressurised, then so now will be the material remaining in bore 14 from the previous injection cycle.

When the body is in the position shown in FIG. 6, bore 14 has connected with outlet 12 thus enabling the pressurised material in bore 14 to be injected. At the same time injection of material from inlet 10 continues since bore 13 is still connected to outlet 12. Thus there is no interruption in injection of material during switching from inlet 10 to inlet 11.

It will be appreciated that the degree of overlap of injection will depend on what fraction angle GOH is of angle EOF, the smaller the fraction the greater the overlap. However also the smaller the fraction the greater the risk of contamination and leakage.

On further movement of the body 9 from the position of FIG. 6 to that of FIG. 7, bore 13 is disconnected from outlet 12 and also from inlet 10.

After injection of material from inlet 11, the body is rotated anti-clockwise through the positions of FIGS. 6, 5 and 4 to 3 in order to revert to the starting position and so injecting a further, small, amount of material from inlet 10 before arriving at the mould isolated position of FIG. 3.

Figure 8:
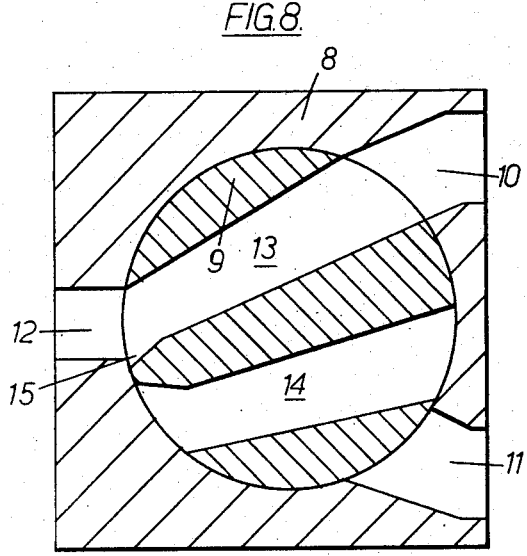
FIG. 8 is a similar view to FIG. 4 but showing a tap with enlarged outlets to the passageways.

In FIG. 8 the system of FIG. 4 is depicted but the outlets of the bores have been enlarged towards each other so that a greater amount of overlap will be achieved. This gives rise to a dead space 15 during injection of material through bore 13 but, it will be appreciated, material built up in this dead space will be swept out during the switchover to injection through bore 14. Thus, in the final stages of injection through bore 13, the only pathway for material from bore 13 to be injected is through the dead space 15 created by the enlargement of the outlet of bore 13.

Figure 11:
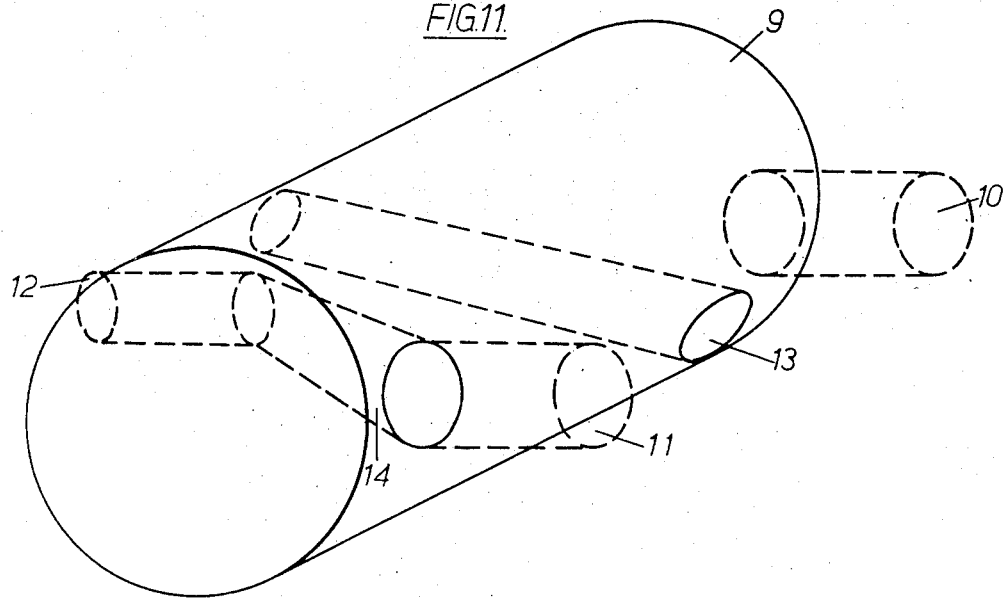
FIG. 11 is a diagrammatic perspective view of the tap body of the embodiment of FIGS. 9 and 10 showing the position of the inlet and outlet ports in relation to the tap body.
Figure 9:
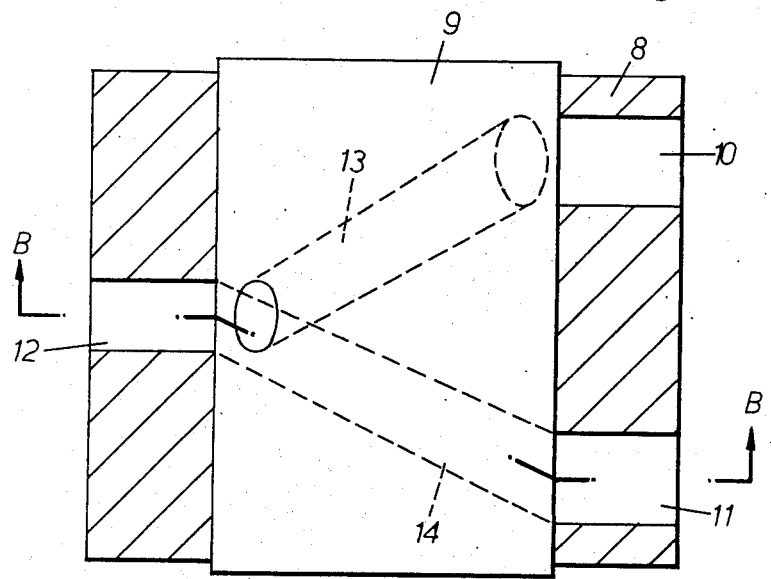
FIG. 9 is a longitudinal section through the housing of yet another form of tap showing the tap body in plan.
Figure 10:
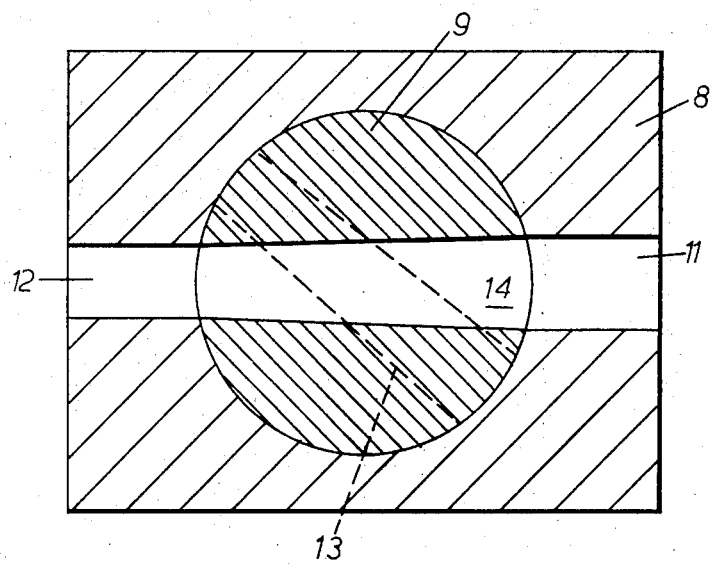
FIG. 10 is a section along the line B–B of FIG. 9.

Another preferred embodiment is depicted in FIGS. 9 to 11 wherein the inlets 10, 11 are in the same plane as the outlet 12 and the longitudinal axis of the body 9. The bores 13, 14 are thus skewed but pass through the longitudinal axis of the body 9. With this design, if desired, the body can be returned to the starting position without reversing the direction of rotation of the body: i.e. there is no need to inject a second charge of material from inlet 10, although this is still preferred for the reasons specified hereinbefore.

I claim:
1. An injection moulding machine having
   i. two separate injection barrels
   ii. a multiway valve comprising a housing having two inlet ports, each connected to one of said injection barrels and
   a single outlet port through which material can be supplied to a sprue channel of a mould, said outlet port being of smaller cross section than said inlet ports, and
   a tap body, which is slidably movable in said housing, having two separate passageways therein arranged such that in one position of the tap body, one passageway is connected to one inlet port and to the outlet port with the other passageway disconnected from the outlet port,
   in another position, the other passageway is connected to the other inlet port and the outlet with said one passageway disconnected from said outlet port and
   in a third position, neither passageway is connected to the outlet port,
   the inlet of each passageway being the same cross section as the inlet port connectable with that passageway and the outlets of said passageways being of smaller cross section than the inlets of said passageways and said passageways being disposed such that as the body is moved from the first position to the second, and vice versa, one passageway communicates with its inlet port before its outlet communicates with the outlet port and
   iii. means for moving said tap body, relative to said housing, from one of said positions to another.

2. An injection moulding machine as claimed in claim 1 wherein said tap body is rotatably mounted in said housing.

3. An injection moulding machine as claimed in claim 1 wherein the inlet ports and the outlet port are in the same plane.

4. An injection moulding machine as claimed in claim 1 wherein when the tap body is in a position wherein one passageway is fully connected to its associated inlet port and the outlet port with the other passageway disconnected from the outlet port, said other passageway is disconnected from its associated inlet port.

5. An injection moulding machine as claimed in claim 1 wherein the outlet of each passageway is of the same cross section as the outlet port.

6. An injection moulding machine as claimed in claim 1 wherein the passageways are disposed such that as the tap body is switched from the position wherein one passageway is connected to its associated inlet port and the outlet port with the other passageway disconnected from the outlet port, to the position wherein the other passageway is connected to its associated inlet port and the outlet port with said one passageway disconnected from the outlet port, and vice versa, one passageway is not fully disconnected from the outlet port until the other passageway has started communicating with the outlet port.

* * * * *